May 4, 1965 M. H. MORTASHED 3,181,621

FLEXIBLE DISC HARROW

Filed Oct. 25, 1963 8 Sheets-Sheet 1

INVENTOR

MERLE H. MORTASHED

BY Semmes and Semmes

ATTORNEYS

May 4, 1965 M. H. MORTASHED 3,181,621

FLEXIBLE DISC HARROW

Filed Oct. 25, 1963 8 Sheets-Sheet 2

INVENTOR

MERLE H. MORTASHED

BY Semmes and Semmes

ATTORNEYS

May 4, 1965 M. H. MORTASHED 3,181,621

FLEXIBLE DISC HARROW

Filed Oct. 25, 1963 8 Sheets-Sheet 3

INVENTOR

MERLE H. MORTASHED

BY Semmes and Semmes

ATTORNEYS

May 4, 1965 M. H. MORTASHED 3,181,621

FLEXIBLE DISC HARROW

Filed Oct. 25, 1963 8 Sheets-Sheet 4

INVENTOR

MERLE H. MORTASHED

BY Semmes and Semmes

ATTORNEYS

INVENTOR
MERLE H. MORTASHED
BY Semmes & Semmes
ATTORNEYS

INVENTOR

MERLE H. MORTASHED

BY Semmes & Semmes

ATTORNEYS

May 4, 1965 M. H. MORTASHED 3,181,621

FLEXIBLE DISC HARROW

Filed Oct. 25, 1963 8 Sheets-Sheet 7

INVENTOR

MERLE H. MORTASHED

BY Semmes & Semmes

ATTORNEYS

INVENTOR
MERLE H. MORTASHED
BY Semmes & Semmes
ATTORNEYS 3,181,621

FLEXIBLE DISC HARROW

Merle H. Mortashed, Chattanooga, Tenn., assignor to The Harriman Manufacturing Company, Chattanooga, Tenn., a corporation of Tennessee Filed Oct. 25, 1963, Ser. No. 318,885
9 Claims. (Cl. 172—455)

The present application relates to agricultural cultivators, particularly a transportable harrow wherein the angle of attack of individual disc gangs may be independently varied.

Numerous previous harrows have been devised wherein a plurality of disc gangs are pivoted to a main beam apart from a rock shaft supporting a pair of transport wheels. Conventionally, these disc gangs are raised from cutting position by hydraulic pivoting of the transport wheels onto the ground and thus raising of the entire main beam and disc gangs above the earth being worked. A shortcoming of such disc gangs has been their lack of rigidity in the raised or transport position, as well as the impossibility of conveniently varying the angle of attack of individual disc gangs during cutting. It is normally desired to vary this angle of attack 12 to 20 degrees from a line perpendicular to the main beam in order to insure that a "middle ridge" is not created by the throwing action of the rear gangs.

The present harrow embodies features which provide for locking rigidity of the fore gangs in transport position, well as unique adjustability of the cutting angle of fore and aft gangs without stopping cultivation. Also, additional unique features are provided for independent flexing of the individual gangs and urging of the rear gangs into the soil. According to the present invention, individual fore and aft gangs are provided. The fore gangs are pivoted inwardly to a main beam within which is reciprocably supported an axial shaft. The fore gangs are connected on their inner ends to the main beam. The rear gangs are pivoted inwardly upon the axial shaft and are connected at their inner ends to the main beam. As a consequence upon reciprocation of the axial shaft, the cutting angle of the fore and aft gangs is varied from perpendicular to the main beam. This change of cutting angle may be completed hydraulically during actual cutting and without shutdown.

Accordingly, it is an object of invention to provide a disc harrow wherein individual disc gangs may independently flex.

Another object of invention is to provide a disc harrow which insures rigidity of the individual disc gangs in cutting angle during transport position.

Another object of invention is to provide a disc harrow wherein the cutting angle of the fore and aft gangs may be varied at will.

Another object of invention is to provide a flexible disc harrow wherein the cutting angle of the rear gangs may be varied independently of the fore gangs.

Yet additional objects of invention will become apparent from the ensuing specification and the attached drawings wherein.

Figure 1:
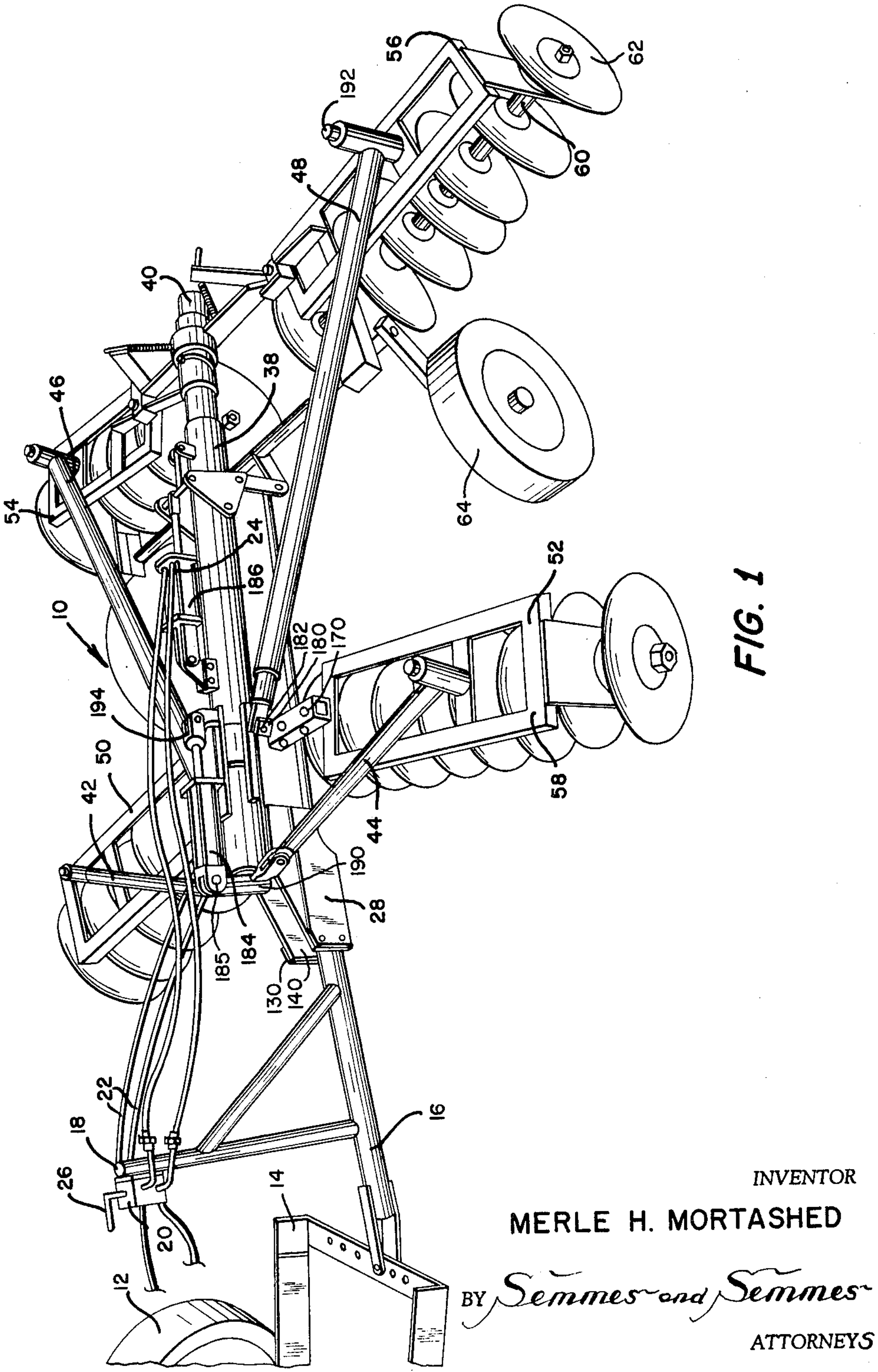
FIG. 1 is a perspective view of the entire apparatus hitched to a tractor, the wheels being in transport position.
Figure 2:
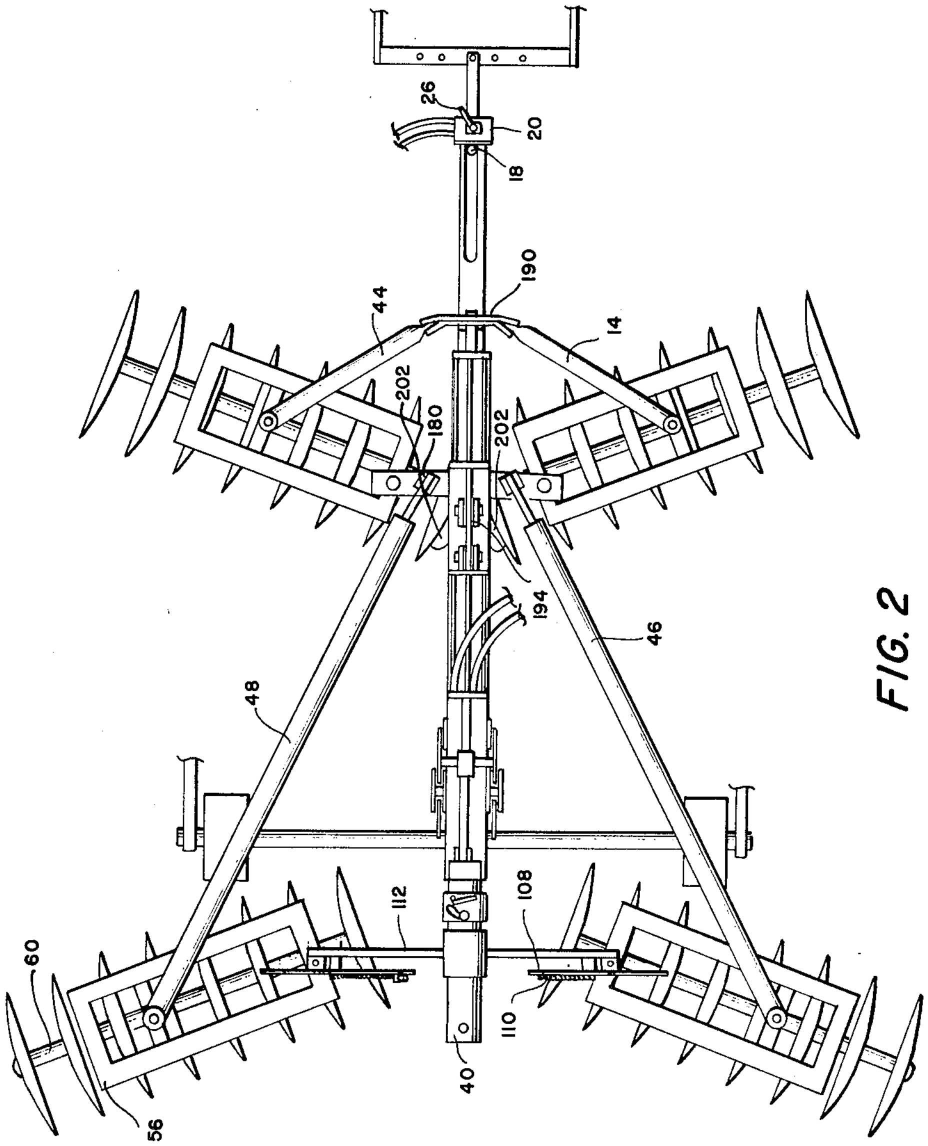
FIG. 2 is a top plan.

In FIG. 1 harrow unit 10 is illustrated as connected via hitch bar 16 to tractor 12 draw bar 14. Hitch 16 includes a hydraulic post 18 which supports hydraulic valve housing 20 and switch 26. Individual gang control lines 22 emanate from housing 20 and are directed to gang cutting angle hydraulic cylinder 184. Transport wheel pivoting control lines 24 emanate from housing 20 and are connected to rock shaft hydraulic control cylinder 186.

Main beam 38 is connected via main beam cam plate 130 to hitch bar 16. A stabilizer bar 102 is interconnected with shaft mid support bracket 88 and hitch bar 16 and as particularly illustrated in FIGS. 8 and 9, pivots about pins 148 and 188 extending through hitch bar 16.

Axial shaft 40 is reciprocably supported within main beam 38 and includes at its forward end foreplate 190 to which the individual radial supporting shafts 42 and 44 are flexibly pivoted. Shafts 42 and 44 at their other ends pivotably encompass a post attached to the individual gang frames 50 and 52. Similar rear gang radial supporting shafts 46 and 48 extend from brackets 180 having counter sunk holes to which they are flexibly pivoted by means of pins 182. Shafts 46 and 48 at their rear ends extend to posts 192 connected to rear frames 54 and 56. All radial supporting shafts partially pull the individual fore and rear gangs and prevent the toppling of the gang while simultaneously permitting flexibility or floating of an individual gang irrespective of the movement of the main beam or the other gangs. Thus, these radial supporting shafts provide flexibility in the outer portion of the individual gangs. As will be hereinafter described, the inner portions of the gangs are bi-axially pivotally connected to the main beam and axial shaft, permitting a measure of vertical, as well as horizontal, flexing during cutting. Within the individual fore and rear gangs axles 60 support a plurality of disc harrow elements 62. Manifestly, cultivating elements other than discs might be conveniently employed.

Figure 5:
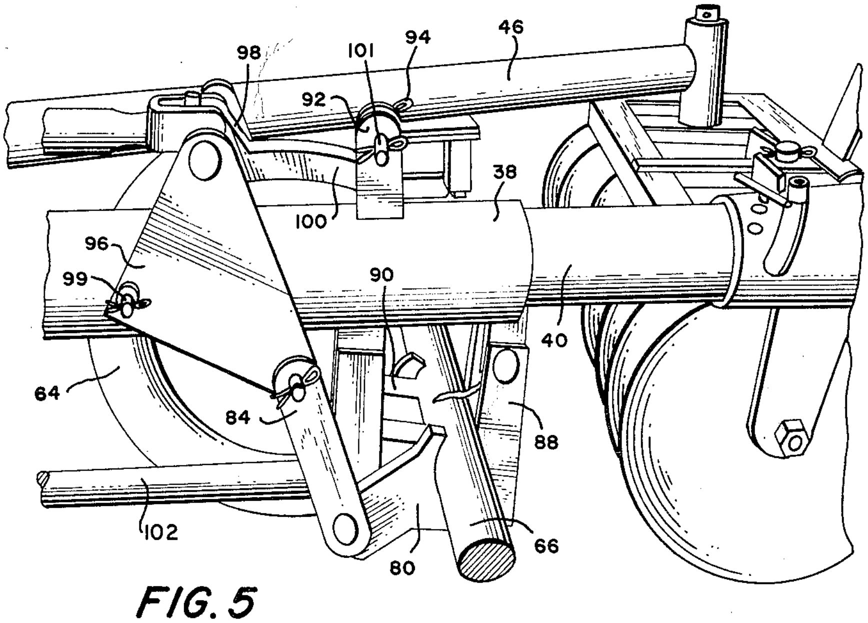
FIG. 5 is an enlarged perspective view of the transport wheel rock shaft bell crank in transport position, the wheels engaging the ground.
Figure 6:
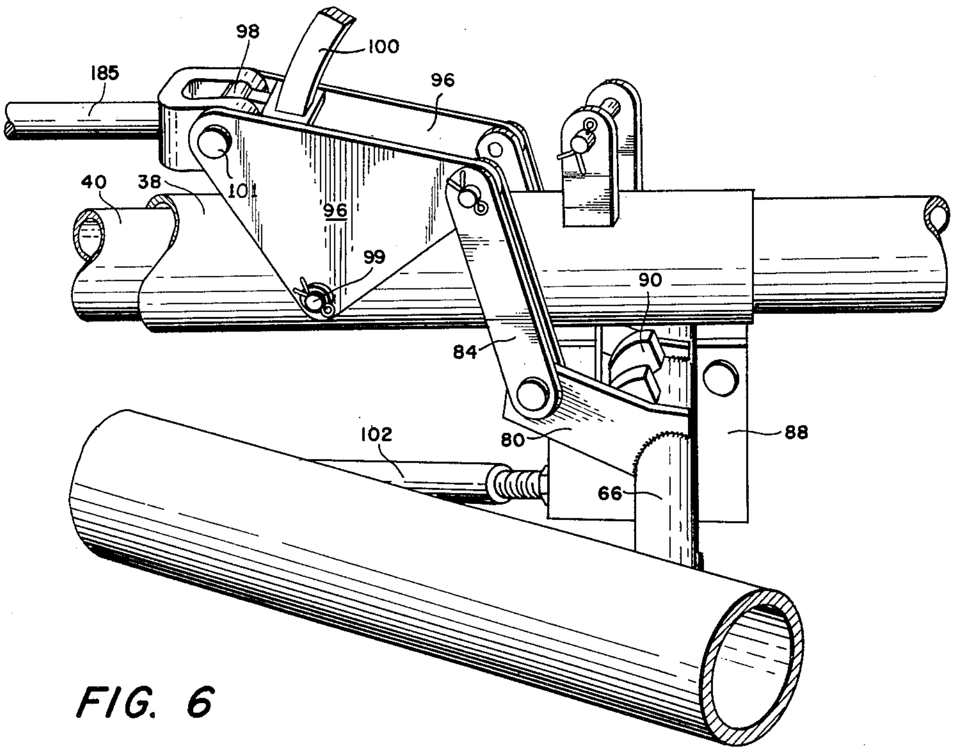
FIG. 6 is an enlarged perspective view showing the bell crank in cutting position, the wheels being lifted from the ground.
Figure 7:
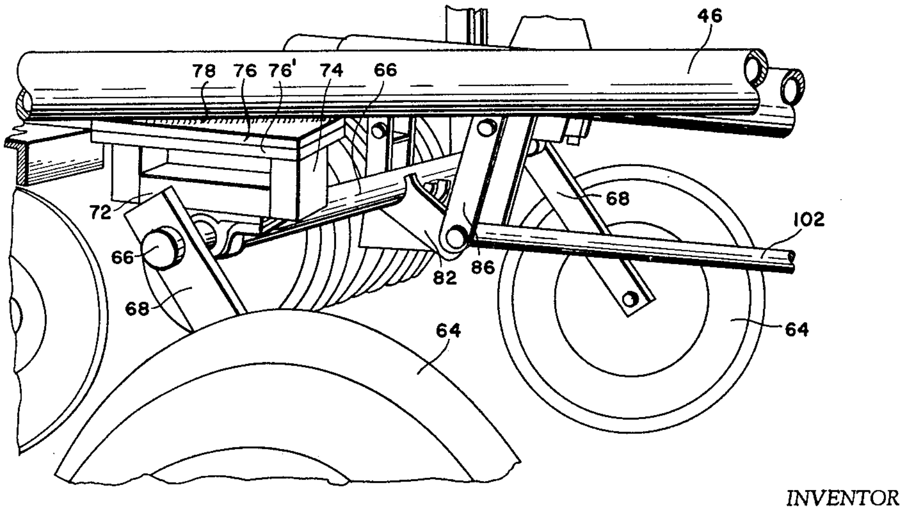
FIG. 7 is an enlarged perspective view showing the trunnion bearing support of the transport wheel rock shaft 66.
Figure 13:
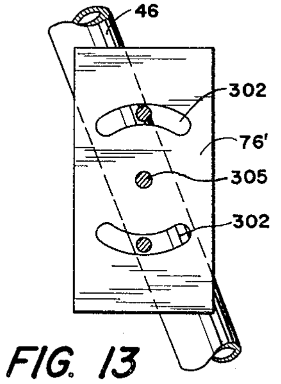
FIG. 13 is a bottom view of the pivot plate assembly.
Figure 12:
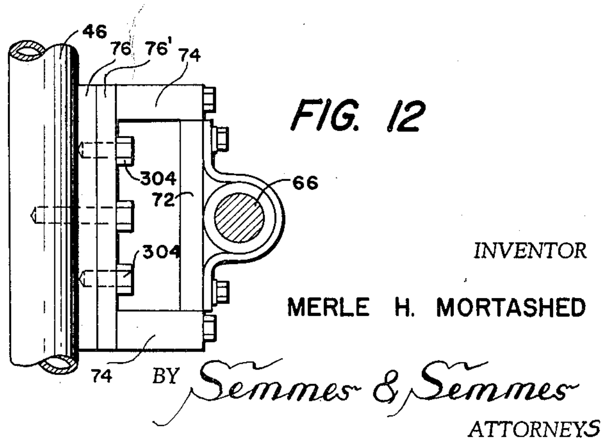
FIG. 12 is a side view of the pivot plate assembly.

As particularly illustrated in FIGS. 5–7, rear transport wheels 64 are mounted by means of arms 68 to rock shaft 66 which is pivoted by means of trunnion 72 within end blocks 74 attached to upper stationary plate 76 and lower pivot plate 76', upper plate 76 being welded at 78 to shaft 46. As seen in FIGS. 12 and 13, pivot plate 76' contains two slotted holes 302 and a single round hole 305 while stationary upper plate 76 contains three tapped holes in concentric relationship thereto through which bolts 304 pass permitting the necessary pivoting of plate 76.

Rock shaft 66 includes support arms 68 and, as illustrated in FIGS. 5 and 6, forearms 80 and 82 linked to separate bell cranks 96 by means of links 84 and 86, bell cranks 96 are pivoted at 99 to main beam 38. A transverse bar 98 is supported between plates 96 and includes lock arm 100 which engages lock bracket 92 and is supported therein by means of pin 101. The fore end of transverse bar 98 is connected to a clevis attached to the piston extension 185 of hydraulic cylinder 186. Rock shaft 66 also includes eccentric blocks 90 guided in mid-support brackets 88 which depend from main beam 38 and serve as a guide for pivoting of rock shaft 66. The entire main beam 38 is horizontally stabilized during pivoting of the rock shaft by means of stabilizer 102 interconnecting mid-support bracket 88 and hitch bar 16.

Figure 3:
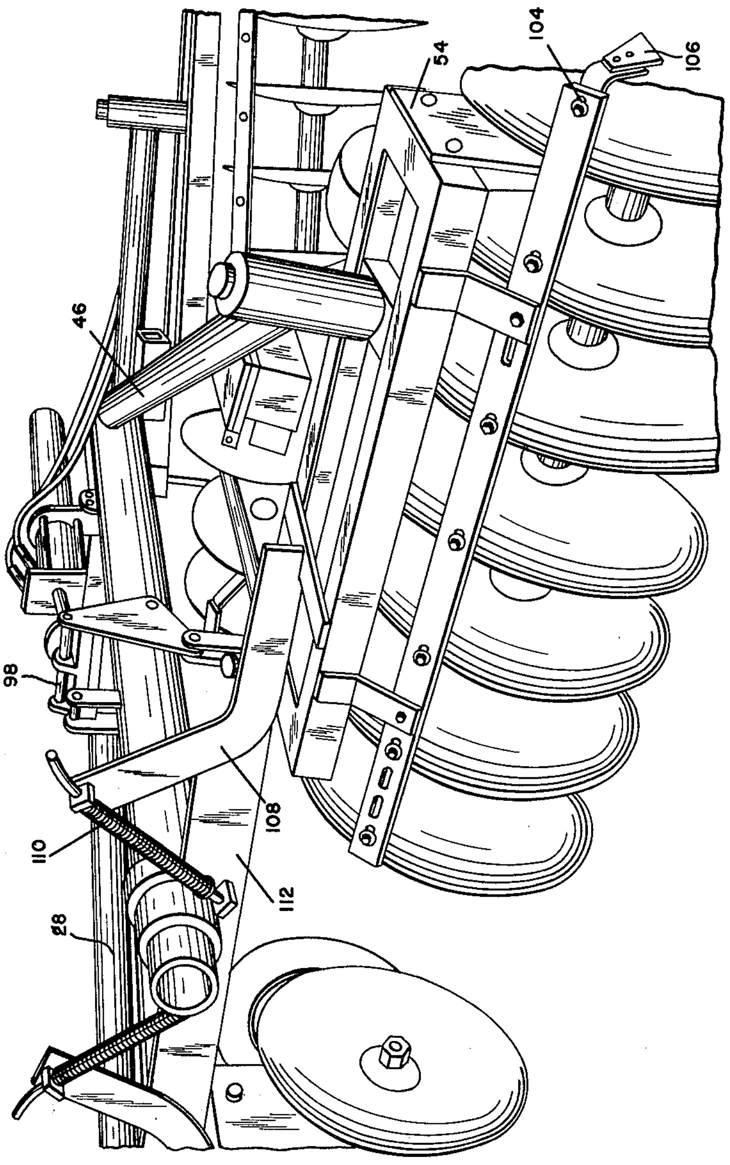
FIG. 3 is an enlarged rear perspective, showing the individual adjusting controls for the rear gang.
Figure 4:
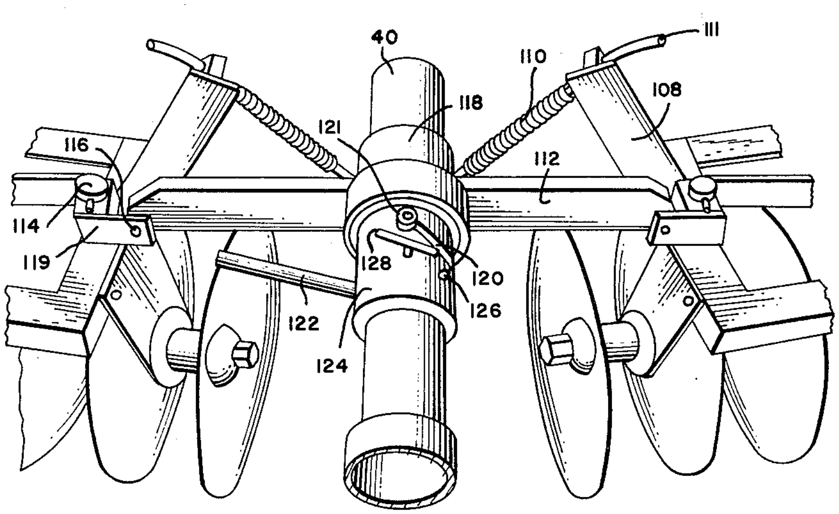
FIG. 4 is an enlarged perspective view of the independent attack angle control for the rear gang.

As illustrated in FIG. 3, both fore and rear gangs may be provided with scraper brackets 104 to which individual scrapers 106 are attachable for engaging the discs. As illustrated in FIG. 4, the individual rear gangs are pivoted horizontally by means of stud 114 engaging brackets 119 to which gang angle control bar 112 is pivoted by means of pin 116. Control bar 112 in turn is integrated with collar 118 fixed about axial shaft 40 by means of sleeve 124.

Individual compression arms 108 may be pivoted at the ends of control bar 112 and urged downwardly onto the top of respective frames 54 and 56 by means of a compression spring 110 mounted concentrically about threaded bolt 111. Longitudinal adjustability of control bar 112 upon axial shaft 40 is provided by the sleeve slot 120 engaging shaft stud 121. Locking of slot 120 about stud 121 is provided by setting holes 126 and locking pin 128. Handle 122 may provide for rotation of sleeve 124 and adjustment of slot 120 about stud 121. Such rotation varies the angle of attack of the rear gangs with respect to the fore gangs, as will be described below.

Figures 8, 9:
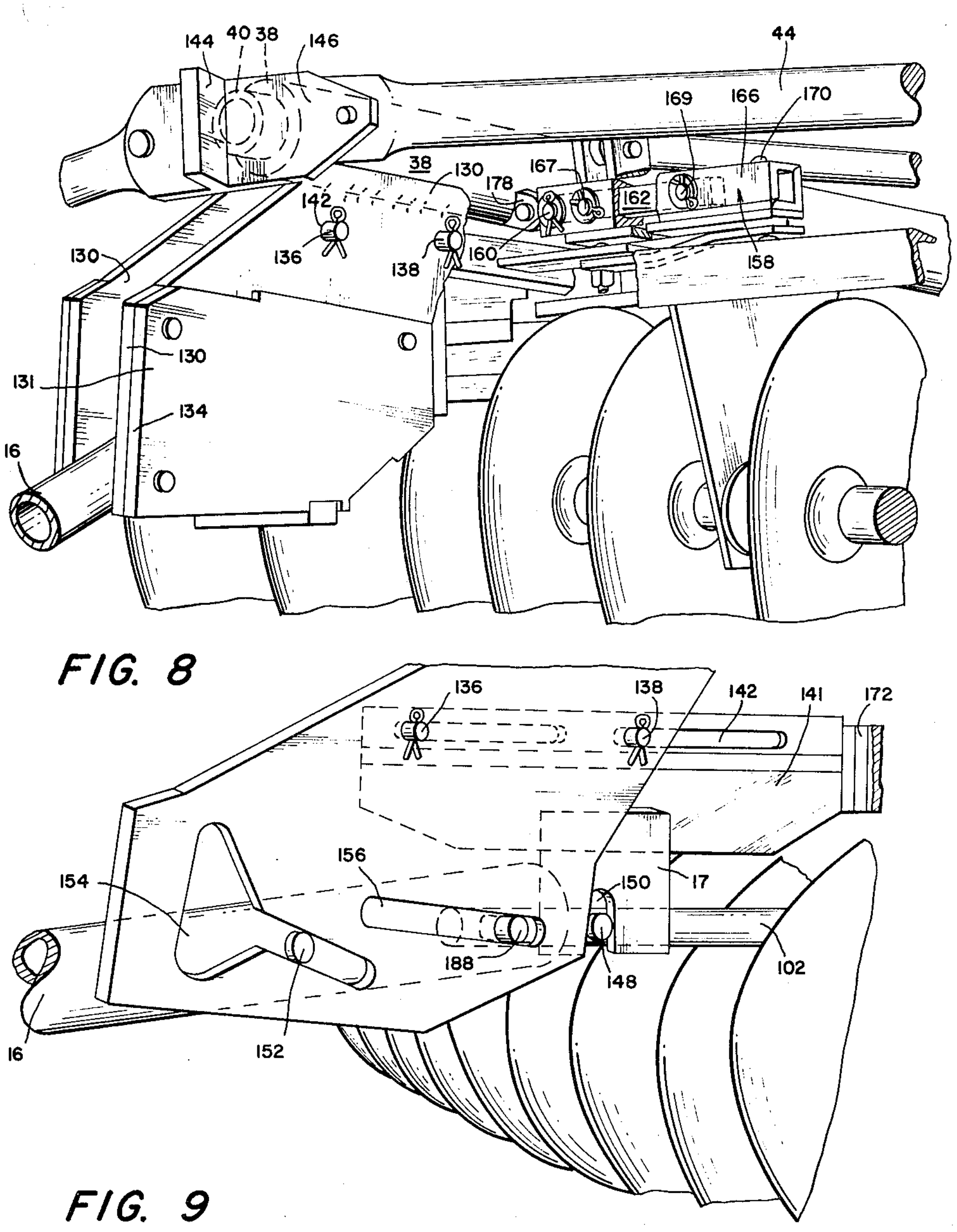
FIG. 8 is a perspective view of the lock plate wherein the main beam fore end is connected to the hitch.
FIG. 9 is a perspective view showing a lock plate with the cover removed and showing the engagement of the hitch bar pin with the cam grooves.

As illustrated in FIGS. 8 and 9, cam plates 130 are permanently attached to main beam 38. Pins 136 and 138 terminate sufficiently beyond the outer surfaces of cam plates 130 to provide retaining means and pass longitudinally through guide slots 142 in lock plate 141. Pin 152 extending into cam slot 154 is simply a guide pin. Pin 188 is the connection of the hitch bar 16 to the stabilizer bar 102 and thence to lock plate 141 by means of engagement of pin 148 into slot 150 within hitch bar 16 extension plate 17. Slot 150 provides vertical clearance to accommodate vertical sweep of the rear extremity of the stabilizer bar during rotation of the rock shaft or vertical flexing of the rear gangs. Slot 156 is simply a limiting guide for pin 188.

Figure 10:
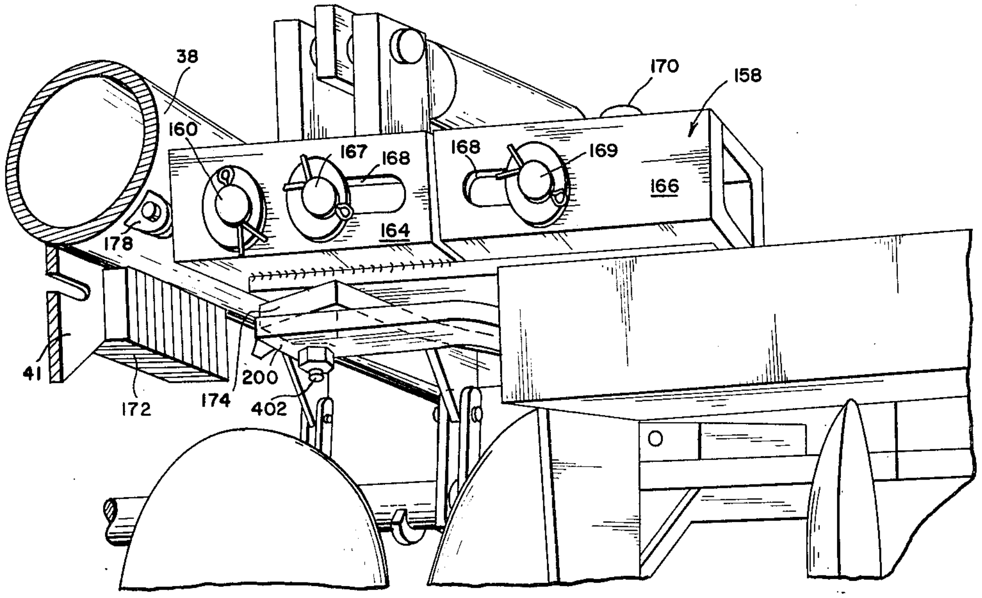
FIG. 10 is a perspective view of the flexing link connection between the individual fore gangs and the main beams.
Figure 11:
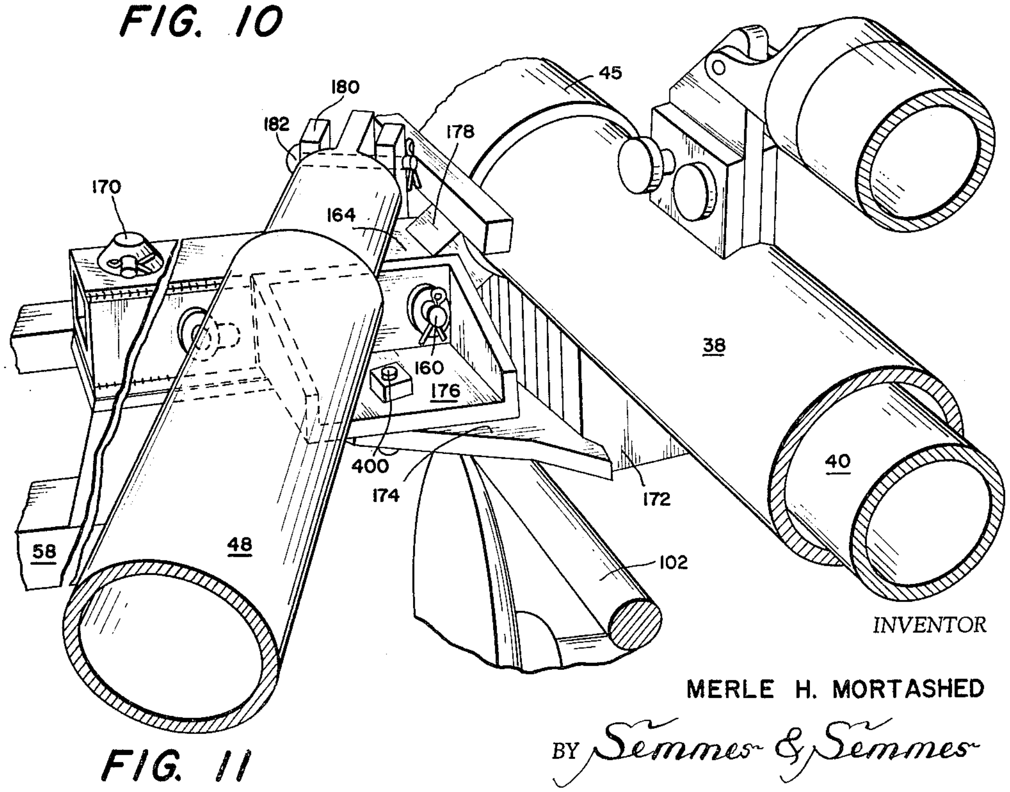
FIG. 11 is a rear perspective view thereof.
Figures 14, 15:
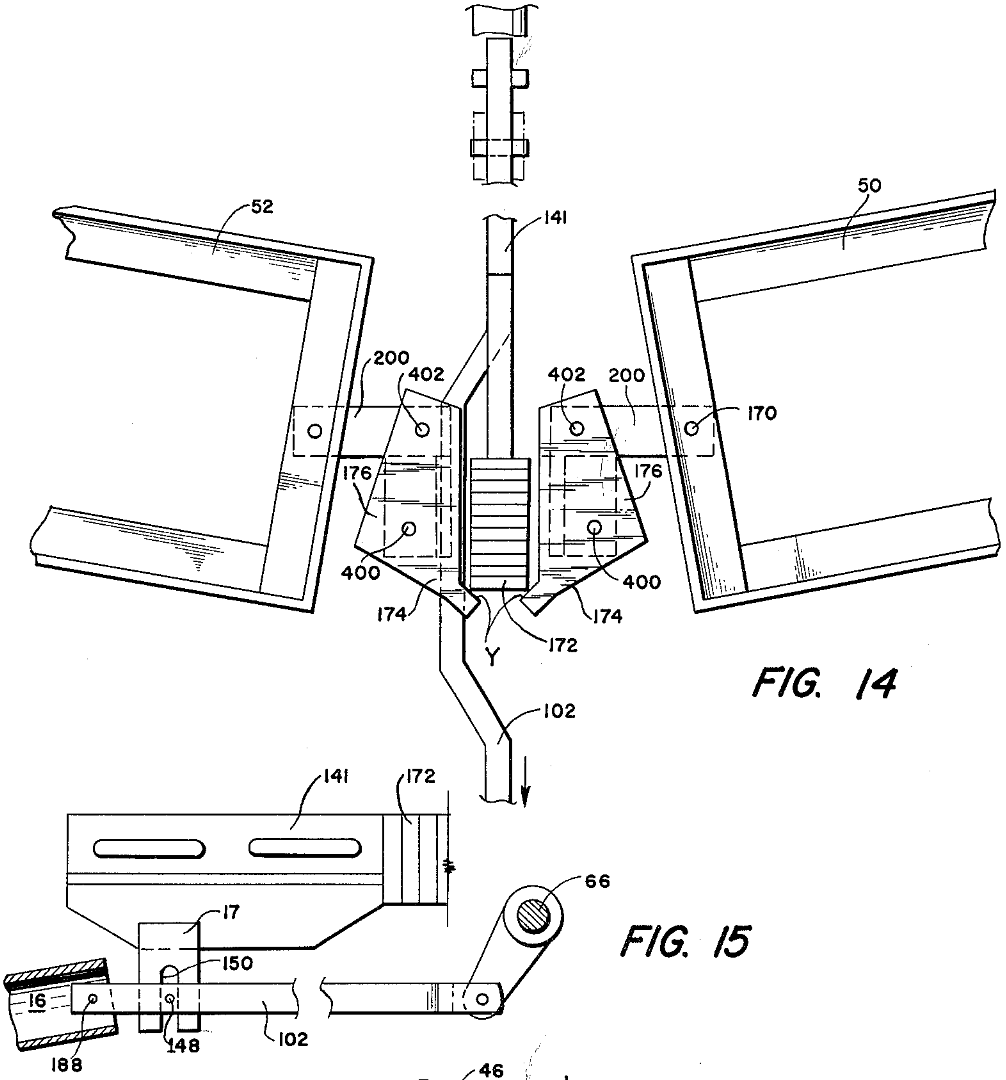
FIG. 14 is a top plan view of stabilizer rod 102 illustrating its use in actuating cams 174.
FIG. 15 is a side elevation of the cam actuating assembly of FIG. 14.

As particularly illustrated in FIGS. 8, 10 and 11, fore gang flexing links 158 are pivoted vertically by means of pin 160 extending through support arm 178 attached to fore swivel collar 45. Outer housing 166 slides horizontally along bar 162 (FIG. 8) by means of pins 167 and 169 extending through slots 168 formed in inner housing 164 and outer housing 166. Washer and cotter pin means may be provided for securement of pins 167 and 169. In outer housing 166 disc gang frame horizontal pivot 170 extends through the individual frames 50 and 52. Plate 172 attached to the rear of lock plate 141 engage cam plate 174, providing longitudinal rigidity of the entire fore gangs in transport position, as the disc gange are raised to transport position. Cam support plate 176 may be viewed in FIG. 11 with arm 174 pivoted therebeneath.

As seen in FIGS. 8 and 9, lock plate 141 is held in slidable connection with cam plates 132 (FIG. 8) by pins 136 and 138 (FIG. 9) which pass through corresponding slots 142 in lock plate 141. Forward and rearward displacement is thereby afforded and governed by pin 148 (FIG. 9) in stabilizer rod 102 in conjunction with slot 150 which is integrally contained in lock plate 141.

As seen in FIGS. 9, 10, 14 and 15, tie bars 200 rotatably interconnect cam plates 174 and horizontal pivot 170. As transport wheels 64 are lowered, stabilizer rod 102 displaces rearwardly simultaneously imparting similar rearward motion to lock plate 141 (FIG. 14) causing bearing plate 172 to contact surfaces Y of cams 174. Continued motion causes cams 174 to rotate about pivots

400 which are in rigid attachment with cam support plates 176. By virtue of this motion, links 200, which intersect cams 174 and front gang frames 50 and 52, correspondingly move frames 50 and 52 toward the center line of the main beam to its transport position. It is feasible to believe that the gang frame will, during actual use, be displaced various amounts from the main beam of the harrow, depending upon the flatness of the ground. During the actual work, lock plate 141 is forwardly disposed permitting free motion to cams 174 by removing the limiting factors of plate 172. This freedom of motion is required to permit the inner extremities of the front gangs to rise and pass over obstacles without causing the outer extremities to do likewise. In actual work, the front gangs tend to remain in contact with each other, the contact point being the bumper washers. This is a rolling contact in actual work as well as when the harrow is going into transport position. As outlined above, lock plate 141 turns the cams 174 which in turn cause the upper portion of the gang frames 50 and 52 to move inwardly, fulcrumed at the bumper washers.

When the harrow is in cutting position cam plates 174 are in complete disengagement with bearing plate 172, thus permitting pivots 170 to move outwardly to the extent as permitted by slots 168. During normal cutting, bumper washers 202 remain in rolling contact with each other. This invention utilizes this phenomenon by using this contact point as a fulcrum, and by virtue of such, and by lateral displacement afforded by slots 168, either or both front gangs 50 and/or 52 can freely elevate themselves at their inner extremities, forming a negative dihedral with the horizontal, the end result being a desired degree of flexibility which will permit the outer extremities of the front gang or gangs to remain in cutting contact with the ground. In this manner, the harrow may be passed along in line with or nearly thereso on or over contours such as rice levees without cutting them down.

By virtue of the geometric configuration of the cam plates 174, the rearward motion of bearing plate 172 contacts the inclined surfaces Y and lines up the linkage to permit uniform and level manipulation.

Radial support arm pivot bracket 180 is mounted on top of inner housing 164 and includes countersunk holes 182 wherein the fore ends of radial support arms 46 and 48 are pivoted by means of pin 181 for a measure of horizontal, as well as vertical pivoting.

Pivoting of gang angle cutting cylinder 184 is by means of support pin 185 connected to axial shaft fore end plate 190. The rear end of cylinder 184 is pivoted to the main beam by means of bracket 194. As will be apparent, the rear end of axial shaft 40 may be capped and additional cultivator hitch means fixed thereto as desired.

Gang angling is achieved by exerting hydraulic pressure within cylinder 184 to the extent that the axial shaft is urged forwardly to combine pivoting of respective fore and aft gangs. When the desired angle of 12 to 20 degrees is achieved, the control valve switch 26 located on the tractor is shifted to closed center. Angling or de-angling of the gangs can be accomplished at any time during use without the necessity of the tractor driver stopping the tractor or having made any previous settings.

The transport wheel mounting permits flexibility of the gangs when in use and prevents gang flexibility when the cutting gangs are raised from the ground for transport. To permit flexibiltiy, rock shaft 66 bearings are mounted in trunnions 72. To permit free rear gang angling trunnions 72 are mounted on pivot plates 76 by welding.

As illustrated in FIG. 6, when in full flex rock shaft cylinder 186 is fully retracted which raises transport arm 80 to the highest position, thus pivoting transport wheels 64 away from the ground while the disc gangs are pivoted into the ground for cutting. In FIG. 5 rock shaft 66 has been pivoted to the extent that arm 80 extends downwardly as the transport wheels 64 engage the earth for transport of the entire assembly.

As illustrated in FIGS. 1, 8 and 9, hitch bar 16 is attached at its forward end to the tractor draw bar 14 and to the cam plate 130 at its rear end. The rear end attachment includes pins 152 and 188 which are engaged in separate linear cam paths 154 and 156. Both cam plates 130 are attached to main beam 38. Rear cam path 156 is straight and limits axial motion as well as prevents vertical motion of the hitch bar. Fore cam path 154 is slightly curved and inclined at its rear portion. The forward portion of curve 154 taperingly enlarges to an opening which is convexly terminated. This permits hitch bar 16 to have free vertical swing when transport wheels 64 are raised for cutting operation. As transport wheels 64 are lowered for transport, stabilizer bar 102 retracts hitch member 16. At a predetermined point of operation the forward cam pin 152 will have been retracted from the free motion stage cam path 154 and will now be entering the limited stage. Once in the limited stage the shape of cam path 154 is such that further progress into it causes a resultant vertical motion to the cam plates 130. This motion is concurrent and congruent with the vertical motion imparted to rock shaft 66 by wheels 64 being forced against the ground. The end result of this is that the harrow or other implement is lifted from the ground in an axially level attitude and is restrained in such manner during transport.

When in cutting position rear pins 152 and 188 of the hitch bar contact the forward extremities of the cam paths 154 and 156. Draft is thereby transferred at the cam plates 130 which are located in the proximity of the front gangs. By slightly lowering transport wheels 64 and by virtue of rock shaft 66 mid-support bracket 88 and eccentric blocks 90, draft is transmitted to the entire assembly at the rock shaft support. This permits the front gangs to semi-float and tends to cause the rear gangs to cut deeper. By virtue of the placement of the rock shaft 66 bearings in the rear of radial support shafts 46 and 48 the rock shaft weight is distributed to the outer portion of the rear gangs when the harrow is in use. This partially counteracts the normal tendency of the rear gangs to elevate themselves at their outer extremities, forming a dihedral angle between the gang planes. Further impedance to this dihedral tendency is accomplished by the adjustable compression spring stabilizers 110. Adjustment is made to suit soil characteristics by increasing or decreasing the compression by turning threaded nut 111 until suitable cutting action is obtained. Also, by virtue of placement of the rock shaft bearings as they are, rear gangs 54 and 56 become stationary when the harrow is in transport due to the direct coupling that is formed when the contact between the wheels and ground automatically nullifies the trunnion effect of the rock shaft bearings and the rock shaft eccentric blocks 90 in the mid-support bracket 88.

The front gangs 50 and 52 are held stationary in transport by virtue of the combined action of bar 102, plate 141 and cams 74.

In addition to the above the flexibility features may be modified or nullified by the utilization of pins and/or other suitable locking or restraining means positioned at or near the flex points.

Manifestly, various changes and substitution of parts may be employed without departing from the spirit and scope of invention as defined in the subjoined claims.

I claim:

1. A flexible harrow comprising:
(*a*) a main hollow tubular beam having a hitch means;
(*b*) an axial shaft extending through said main beam;
(*c*) at least two fore gangs of ground cultivating means attached to and inwardly pivoted with respect to said main beam and outwardly connected to the fore end of said axial shaft, said gangs including means for independent pivoting in a vertical direction;
(*d*) at least two rear gangs of ground cultivating means pivoted to the rear end of said axially reciprocable shaft; and
(*e*) means reciprocating said axial shaft with corresponding means to pivot said gangs with respect to said main beam and vary the angle of attack of said ground cultivating means with respect to said main beam.

2. A flexible harrow as in claim 1 including a rock shaft with transport wheels rotatably supported from said main beam together with means pivoting said rock shaft during transport and disc cutting.

3. A flexible harrow as in claim 1, wherein said harrow includes means for locking said fore gangs in transport position to said main beam.

4. A flexible harrow as in claim 2 including compression means interposed between said axial shaft and the top of said rear gang.

5. A flexible harrow as in claim 4 including a sleeve surrounding said axial shaft, said sleeve being provided with a slot engaging a stud attached to said axial shaft; such that, said rear gang is longitudinally adjustable upon said axial shaft so as to vary the angle of attack of said rear gang with respect to the angle of attack of said fore gang.

6. A flexible harrow as in claim 5, wherein said reciprocating means includes hydraulic means supported thereon and interconnecting said main beam and the fore end of said axial shaft.

7. A flexible harrow as in claim 6, wherein said pivoting means includes hydraulic means supported thereon and connected to said rock shaft.

8. A flexible disc harrow comprising:
(*a*) a main beam having a tractor hitch means;
(*b*) an axial shaft extending through said main beam;
(*c*) a rock shaft with transport wheels rotatably supported upon said main beam by a plurality of plates attached thereto and including hydraulic means pivvoting said rock shaft during transport and disc cutting;
(*d*) a pair of fore disc gangs inwardly and independently flexibly pivoted to said main beam and outwardly connected to the fore end of said axial shaft by means of a radial support rod;
(*e*) a pair of rear disc gangs pivoted to the rear end of said axial shaft, each gang being connected at its outer end by a radial extension rod to said main beam, including compression means positioned intermediate said axial shaft and the top of said gangs;
(*f*) hydraulic means supported upon said main beam and connected to the fore end of said axial shaft, reciprocating said axial shaft so as to vary the angle of said disc gangs to said main beam; and
(*g*) stabilizing means interconnecting said rock shaft and the fore end of said beam.

9. A flexible disc harrow as in claim 8, said rock shaft ends being supported in trunnions attached to each of said rear gang radial extension rods.

References Cited by the Examiner

UNITED STATES PATENTS

| | | | |
|---|---|---|---|
| 2,196,713 | 4/40 | Warne | 172—583 X |
| 2,813,389 | 11/57 | Padrick | 172—595 X |

FOREIGN PATENTS

| | | |
|---|---|---|
| 842,618 | 7/60 | Great Britain. |

ANTONIO F. GUIDA, *Acting Primary Examiner.*

T. GRAHAM CRAVER, *Examiner.*